United States Patent [19]

Janda

[11] Patent Number: 4,542,494
[45] Date of Patent: Sep. 17, 1985

[54] ARRANGEMENT FOR FASTENING A PHONOGRAPH STYLUS HOLDER TO THE TONE ARM

[75] Inventor: Jiri Janda, Prague, Czechoslovakia

[73] Assignee: TESLA, koncernoxy podnik, Prague, Czechoslovakia

[21] Appl. No.: 435,918

[22] Filed: Oct. 22, 1982

[30] Foreign Application Priority Data

Apr. 20, 1982 [CS] Czechoslovakia ............... 2826-82

[51] Int. Cl.$^4$ .............................................. G11B 3/02
[52] U.S. Cl. .................................................. 369/256
[58] Field of Search ............... 369/256, 244, 247, 248, 369/251, 253, 254

[56] References Cited

U.S. PATENT DOCUMENTS

| | | | |
|---|---|---|---|
| 2,453,894 | 11/1948 | Chorpening | 369/256 |
| 3,602,519 | 8/1971 | Bubbers | 369/256 |
| 3,865,384 | 2/1975 | Yoshida | 369/244 |
| 4,205,856 | 6/1980 | Hayashi | 369/256 |
| 4,276,635 | 6/1981 | Obata et al. | 369/256 |

Primary Examiner—Steven L. Stephan

[57] ABSTRACT

Arrangement for fastening a phonographs stylus holder to its tone arm. The arrangement has a plurality of pins affixed to the tone arm, and sleeves inserted in openings in the stylus holder. The sleeves are slipped onto the pins and have a frictional engagement therewith. The lower ends of the sleeves are provided with flanges which underlie opposite edge portions of the stylus holder. In one embodiment of the arrangement the passages through the sleeves are concentric with the external cylindrical surfaces of the sleeves, and in another embodiment the passages through the sleeves are eccentric with respect to the outer cylindrical surfaces of the sleeves whereby turning of the sleeves permits an angular adjustment of the stylus holder with respect to the tone arm. Indicium means may be provided on the sleeve to indicate the angular position of the sleeves relative to the stylus holder.

6 Claims, 5 Drawing Figures

ARRANGEMENT FOR FASTENING A PHONOGRAPH STYLUS HOLDER TO THE TONE ARM

This invention relates to an arrangement for fastening a phonograph stylus holder to the tone arm.

Up to now stylus holders of phonographs have been fastened on tone arms by two bolts provided with nuts. Openings or slots in the tone arm with the necessary clearance had to be provided for this purpose for an easy screwing-on of the stylus holder, and in order to compensate for manufacturing tolerances. Due to these clearances, however, it is impossible to guarantee that the stylus holder after assembling with the tone arm will have its longitudinal axis disposed at the optimum angle determined by the horizontal geometry of the tone arm, i.e. exactly perpendicular to the line connecting the fastening openings. The recommendation generally given by the manufacturer is to press the stylus holder forwardly or backwardly prior to tightening the screw bolts; this usually fails in practice as generally substantial shearing forces are generated below the head of the tightening screw bolts which usually disturb the adjusted position of the stylus holder. In many cases the thus fastened stylus holder is thereby turned so that its longitudinal axis is not in its optimum position. The respective deviation can be visually determined, or can be determined, but with difficulty, by means of simple technical means. Such deviation is usually the cause of a faulty adjustment of the horizontal angle of the stylus holder.

By using the ordinarily-employed fastening means of the stylus holder which uses two screw bolts, it is thus impossible to eliminate a possible additional error in the horizontal angle which can disturb the horizontal geometry of the tone arm. Thus the distortion due to the second harmonic frequency is particularly increased if an error in the assembling is added to the maximum deviation of the horizontal angle of the stylus holder with cranked tone arms. Still more substantial errors can occur due to inaccurate assembling of the stylus holder with the tone arm wherein two longitudinal and parallel openings are provided instead of the usually used circular fastening openings. Longitudinal openings serve for adjustment of the optimum overlapping of the stylus beyond the axis of the turntable in some stylus holders wherein the distance between the vertical planes of the stylus and the fastening screws differs from the standardized value. However, it is difficult to utilize in practice this possibility as the risk of an angularly faulty assembling of the stylus holder and of an additional distortion is here still higher than with circular openings with the customary clearance around the bolts.

The fastening of the stylus holder by screw bolts has other drawbacks in addition to harmful clearances. Due to different shapes, thicknesses and lengths of fastening openings or slots of stylus holders or tone arms, screws of substantially different lengths have to be used, and in most cases special nuts of smaller diameter than standardized diameters also have to be used. This described operation is relatively difficult and lengthy, not only for the common user, but the assembling of the parts by screw bolts is also one of the more difficult and time-consuming functions in mass production.

It is an object of the present invention to eliminate the above-mentioned drawbacks. According to this invention, fastening pins for the stylus holder are provided directly on the tone arm, the stylus holder being fastened on these pins by means of sleeves disposed in openings in the stylus holder and adapted to be slipped onto said pins. The passages or openings in these sleeves can be eccentric with respect to their circular cylindrical outer surface. The outer or lower ends of the sleeves can be provided with flanges which may bear indicia designating their angular position about their axes. The fastening pins can also be electrically connected with at least one current conductor for connection to the stylus holder.

The improved results achieved by the fastening arrangement in accordance with the invention as compared with prior arrangements can be summarized by citing the following advantages of the present invention:

1. The accuracy of the position of the assembled stylus holder is solely and once and for all determined in the course of the manufacturing process, so that any additional manipulation of the arrangement by the user is unnecessary.

2. Stylus holders having a distance of the plane of the stylus from the plane of the fastening openings which is different from a standard difference are fastened by means of eccentric sleeves which can be turned to the required position according to the indicia on either one or both sleeves. The sleeves can be turned in different directions if necessary. The assembled stylus holder can also be turned through an accurately determineable angle different from a standard angle, thus compensating for the influence of a different overlapping. It is thus possible to obtain the same obtimum course of the horizontal deviation of the stylus holder as with stylus holders having a standardized distance of the stylus from the fastening openings.

3. Assembling and disassembling of the stylus holders according to this invention is substantially quicker than with stylus holders fastened by means of bolts and nuts.

4. If the bolts are used as contacts in connection with specially adjusted stylus holders, any elaborate electrical interconnection of assembled stylus holders by three or four fine supply conductors with sliding tubes is eliminated.

The arrangement for the fastening of stylus holders according to this invention will be more readily understood upon consideration of the accompanying drawings, wherein.

Figure 1:
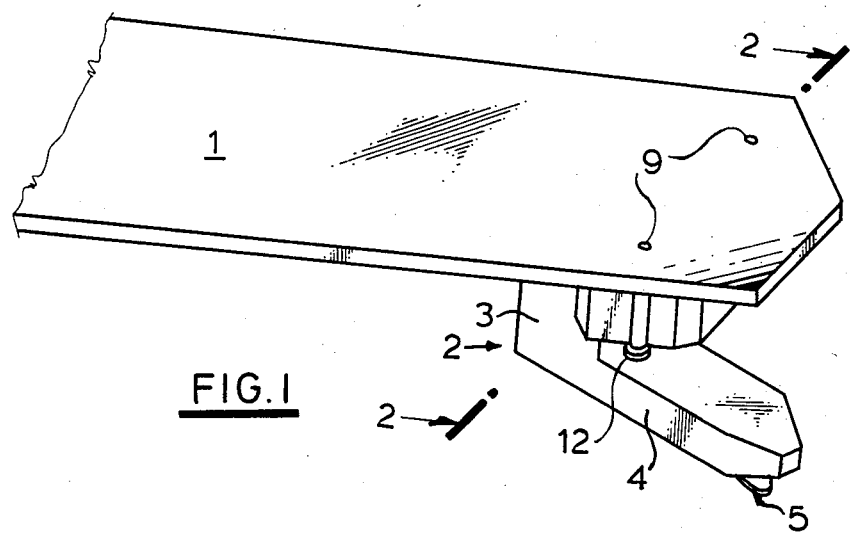
FIG. 1 is a view in perspective of the end of a tone arm provided with a stylus holder attached thereto by a first embodiment of the stylus holder attaching arrangement in accordance with the invention.
Figure 2:
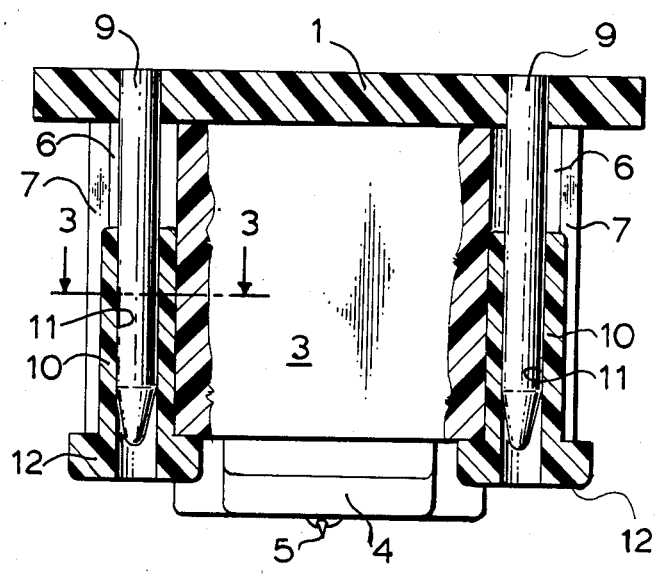
FIG. 2 is a view in vertical cross-section through the tone arm and stylus holder in FIG. 1, the section being taken along the line 2—2 in FIG. 1.
Figures 3, 4, 5:
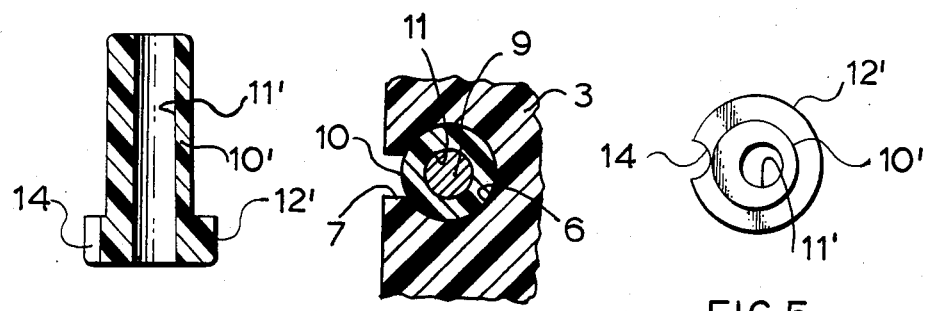
FIG. 3 is a view in horizontal cross-section through the stylus holder, the section being taken along the line 3—3 in FIG. 2.
FIG. 4 is a fragmentary view in axial cross-section through a stylus holder mounting sleeve employed in a second embodiment of stylus holder mounting arrangement in accordance with the invention.
FIG. 5 is a view in plan of the sleeve shown in FIG. 4.

Turning first to the embodiment of FIGS. 1, 2 and 3, a tone arm 1 is shown with a stylus holder 2 mounted therebeneath. The stylus holder is generally of L-shape, having a vertical rear portion 3 and a horizontal forward portion 4 upon which a stylus 5 is mounted. The tone arm 1 and the stylus holder 2 are preferably made of plastic material, as shown. On opposite sides of the portion 3 of the stylus holder there are provided aligned vertical part-circular cylindrical bores 6 which are open at a respective outwardly disposed vertical slot 7.

A pair of vertical pins 9 are secured at their upper ends to the tone arm 1, the pins 9 being coaxial with the respective passages 6 in the opposite sides of the part 3 of the stylus holder. The pins 9 have downwardly converging frusto-conical lower ends which are rounded at their lower termini.

The stylus holder 2 is supported and located upon the tone arm 1 by a pair of sleeves 10 having passages 11 therewithin, passages 11 being coaxial with the outer circular cylindrical main surface of the sleeves 10. Sleeves 10 are made of at least slightly resilient plastic material, and the diameters of the pins 9 and of the bores 11 through the sleeves are such that when the sleeves are thrust upon the pins they are firmly held in position by friction because the pins and the sleeves. Each of the members 10 has a transverse flange 12 at its lower end, such flange underlying the laterally outer lower edge of the part 3 of the stylus holder. Because of the accuracy of location and size of the part-cylindrical bores 6, the outer and inner surfaces of the sleeve 10, and the diameter and location of the pins 9, when the parts are of standard dimensions the stylus holder 2 is very accurately mounted upon the tone arm 1.

FIGS. 4 and 5 illustrate a second embodiment of sleeve which can be employed with the tone arm 1, and the stylus holder 2 to form an arrangement of stylus holder which permits a certain degree of adjustment of the stylus holder with respect to the tone arm. Parts in FIGS. 4 and 5 which are similar to those in FIGS. 1, 2 and 3 are designated by the same reference characters but with an added prime.

In the sleeve 10' of FIGS. 4 and 5 the passage 11' through the sleeve is eccentric with respect to the main external circular cylindrical surface of the sleeve. As a result, the turning of one or both of the sleeves 10' permits the stylus holder to be adjusted angularly with respect to the tone arm. In order to give a visual indication of the amount of such turning of the sleeves 10', the flange 12' of each is provided with a scalloped or cut out portion 14 which acts as an indicium, and may cooperate with an index mark on adjacent structure such as the horizontal portion 4 of the stylus holder. It will be seen that when the sleeves 10' are mounted in the arrangement in the positions thereof shown in FIGS. 4 and 5 the stylus holder 2 will occupy its furthest counter-clockwise position relative to the tone arm 1 as the arrangement is shown in FIG. 1. Turning of the sleeves 10' in either direction from the terminal position of FIGS. 4 and 5 will turn the stylus holder 2 clockwise with respect to the tone arm 1 as the arrangement is shown in FIG. 1.

Although the invention is illustrated and described with reference to a plurality of embodiments thereof, it is to be expressly understood that it is in no way limited to the disclosure of such preferred embodiments but is capable of numerous modifications within the scope of the appended claims.

We claim:

1. An arrangement for fastening a phonograph stylus holder beneath its tone arm, comprising
    pins electrically connected with at least one supply conductor for the stylus holder and having a smooth cylindrical surface fixed to the tone arm;
    sleeves situated in openings in the stylus holder and adapted to be slipped onto and frictionally to engage the pins, the sleeves being mounted on the stylus holder for rotation about respective axes parallel to external cylindrical surfaces of the sleeves to provide angular adjustment of the stylus holder with respect to the tone arm;
    internal passages within the sleeves that are eccentric with respect to the external cylindrical surfaces of the sleeves; and
    flanges at the lower ends of the sleeves which overlap with the lower opposite edges of the stylus holder.

2. An arrangement as in claim 1 wherein the flanges are provided with an indicium to indicate their angular position.

3. An arrangement for fastening a phonograph stylus holder beneath its tone arm, comprising
    pins having a smooth cylindrical surface fixed to the tone arm and having downwardly converging frusto-conical lower ends which are rounded at their lower termini;
    sleeves situated in openings in the stylus holder and adapted to be slipped onto and frictionally to engage the pins, the sleeves being mounted on the stylus holder for rotation about respective axes parallel to external cylindrical surfaces of the sleeves to provide angular adjustment of the stylus holder with respect to the tone arm;
    internal passages within the sleeves that are eccentric with respect to the external cylindrical surfaces of the sleeves; and
    wherein the pins have downwardly converging frusto-conical lower ends which are rounded at their lower termini.

4. An arrangement as in claim 3 wherein the flanges are provided with an indicium to indicate their angular position.

5. An arrangement for fastening a phonograph stylus holder beneath its tone arm, comprising
    pins electrically connected with at least one supply conductor for the stylus holder and having a smooth cylindrical surface fixed to the tone arm;
    sleeves situated in openings in the stylus holder and adapted to be slipped onto and frictionally to engage the pins;
    internal passages within the sleeves that are coaxial with respect to the external cylindrical surfaces of the sleeves; and
    flanges at the lower ends of the sleeves which overlap with the lower opposite edges of the stylus holder.

6. An arrangement for fastening a phonograph stylus holder beneath its tone arm, comprising
    pins having a smooth cylindrical surface fixed to the tone arm and having downwardly converging frusto-conical lower ends which are rounded at their lower termini;
    sleeves situated in openings in the stylus holder and adapted to be slipped onto and frictionally to engage the pins;
    internal passages within the sleeves that are coaxial with respect to the external cylindrical surfaces of the sleeves; and
    wherein the pins have downwardly converging frusto-conical lower ends which are rounded at their lower termini.

\* \* \* \* \*